(No Model.)

S. FREEMAN.
BROADCAST SEEDER.

No. 321,704. Patented July 7, 1885.

Witnesses:
E. G. Asmus
R. Platz

Inventor:
Stephen Freeman
By Stout & Underwood
Attorneys.

UNITED STATES PATENT OFFICE.

STEPHEN FREEMAN, OF RACINE, WISCONSIN.

BROADCAST SEEDER.

SPECIFICATION forming part of Letters Patent No. 321,704, dated July 7, 1885.

Application filed November 19, 1884. (No model.)

*To all whom it may concern:*

Be it known that I, STEPHEN FREEMAN, of Racine, in the county of Racine, and in the State of Wisconsin, have invented certain new and useful Improvements in Broadcast Seeders; and I do hereby declare that the following is a full, clear, and exact description thereof.

My invention relates to improvements in seeders, and will be fully described hereinafter.

Figure 1:
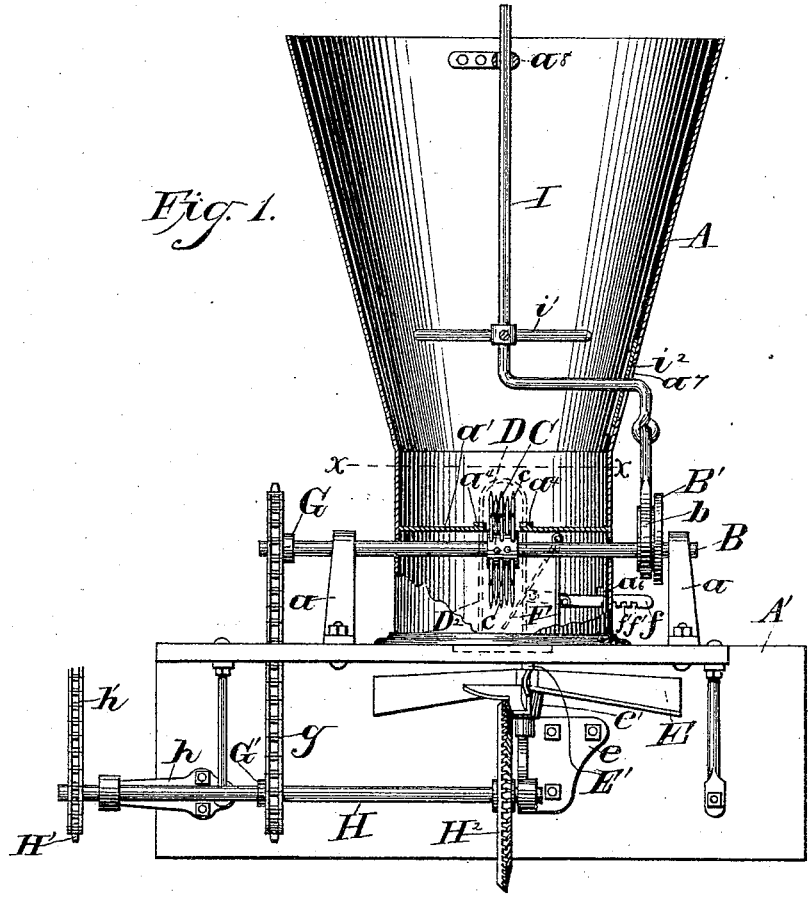
Figure 2:
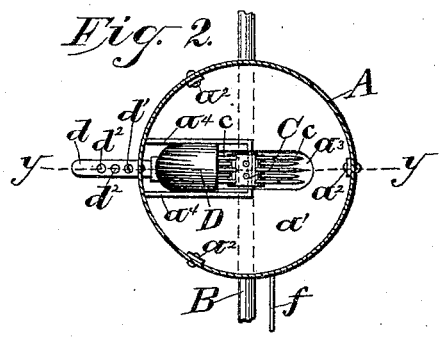
Figure 3:
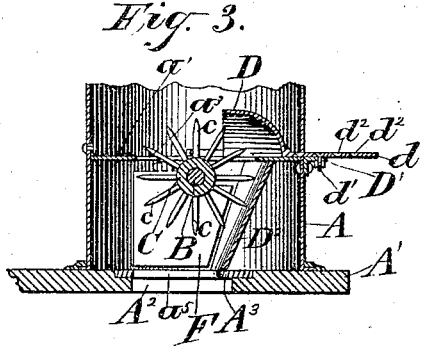

In the drawings, Figure 1 is a vertical longitudinal section through the center of the seed-box of a seeder embodying my invention. Fig. 2 is a sectional view of the same on line $x\ x$ of Fig. 1, and Fig. 3 is a vertical section on line $y\ y$ of Fig. 2.

A indicates the feed-box of my improved seeder. and this box is mounted in any suitable manner in the frame A'. Journaled in the bearing-brackets $a\ a$ of the frame is a shaft, B, which passes through the center of the box, near its lower end, and carries therein the seed-picker or feeder C. Slightly above the shaft B is the bottom board, $a'$, suitably supported at $a^2\ a^2$ in the periphery of the box. A slot, as shown at $a^3$, is cut in the center of this bottom, wherein the upper portion of the seed-picker projects up freely. Running within guide-bars $a^4\ a^4$, fastened along the edges of the slot $a^3$, is a hood-shaped guard, D, and this is provided with stem $d$, that extends outward through a suitable perforation in the box-side, and that serves to hold the guard in position to cover more or less of the seed-picker, according to the quantity of the seed to be distributed. A small bracket, D', fastened on the outside of the box just below and opposite the stem $d$, is perforated to receive a bolt, $d'$, that may be inserted in either one of the perforations $d^2\ d^2$ of the stem to fasten the guard in the adjustment desired. Opposite the said guard D, I fasten in the under side of the bottom $a'$ the spout-shaped guard $D^2$, inclined toward the picker, and inclosing its lower portion in a manner to prevent any of the seed falling down through the hood-covered side of the slot $a^3$. Opposite this latter an opening, $A^2$, is cut into the horizontal portion of the frame A', on which the seed-box is supported, and in this opening is fitted the bottom piece, $A^3$, which is slotted at $a^5$ to correspond with that part of the slot $a^3$ through which the seed is let out by the feeder-pegs $c\ c\ c$. As the seed falls through the slot $a^5$, it is caught and scattered on the ground by the fan-wheel E. This latter is keyed onto the vertical shaft E', which is mounted in suitable bearings of the bracket $e$, so as to lie in a vertical plane slightly distant, but parallel to the plane of rotation of the seed-picker or feeder C. This arrangement will cause the seed to drop onto the wings of the fan-wheel E at a slight distance from its center; and to increase that distance and drop the seed so that it may strike the wings farther toward the circumference of the fan-wheel, I provide an adjustable trap or slide, F, which is hung in the under side of the bottom board, $a'$. This trap may be more or less inclined inward toward the lower portion of the seed-picker C by means of the lever $f$, hinged on the rear face of the said trap and projecting out of the box-side through the slot $a^6$. By means of notches $f'\ f'$, cut in the under side of this lever, either one of which may catch in the upper edge of the slot $a^6$, the trap may be held in proper adjustment, as required. The shaft B carries a sprocket-wheel, G, that is connected through the chain-belt $g$ to the sprocket-pinion G', keyed onto the shaft H. This shaft has suitable bearings on the brackets $e$ and $h$, and carries, keyed onto its outer end, the sprocket-wheel H', which is connected through the chain-belt $h'$ to the driving-shaft of the machine. (Not shown in the drawings.) The said shaft carries also, close to its opposite end, the beveled cog-wheel $H^2$, and this meshes with a beveled pinion, $e'$, keyed onto the vertical shaft E'. The shaft B has keyed onto it, close to box A, an eccentric, B', and this is connected through a suitable stirrup or strap, $b$, to the lower end of the crank-rod I. The horizontal portion of this rod is passed through the side of the box, in which is cut a slot, $a^7$, of a length corresponding to the motion which the rod I may receive from the eccentric B'; and in order to prevent the small seed from passing out of the box through the slot $a^7$, a small plate, $i^2$, is fitted to slide, with the said rod I, on the inner face of the box as the said rod is moved up and down with its cross-rod $i'$ to agitate and press down the seed onto the feeder C. The upper end of the rod I is adapted to slide freely into the perforated end of the bracket $a^3$, fastened into the inner face of the box, close to its upper rim.

The sprocket-wheels G and H' and pinion $g'$ may be variously interchanged when found desirable to vary the quantity of the seed to be distributed beyond the measure allowed by the adjustment of the hood-shaped guard D.

This machine is especially intended for use with blue-grass, red-top, and other grass seed of a light, fluffy nature.

Having thus described my invention, what I claim as new, and desire to secure by Letters Patent, is—

1. In a seed-distributer, in combination with the box A, having the slotted bottom $a'$, a seed-feeder having a series of pegs projecting radially from it and mounted in the slotted bottom, means for regulating the flow of the seed and for guiding the same from the seeder to the distributer, and an adjustable hinged apron to vary the throw of the latter, substantially as set forth.

2. The combination, with a feed-wheel and an adjustable hood, of an apron depending from the bottom of the box or hopper and partly beneath the said feed-wheel, substantially as described, and for the purpose set forth.

3. In a grass-seed distributer, the combination of the feed-wheel located below the bottom of the hopper and projecting up therethrough, and adjustable guiding-apron for regulating the direction of the flow of the seed to the distributing-wheel, substantially as set forth.

In testimony that I claim the foregoing I have hereunto set my hand, at Milwaukee, in the county of Milwaukee and State of Wisconsin, in the presence of two witnesses.

STEPHEN FREEMAN.

Witnesses:
S. S. STOUT,
H. J. FORSYTHE.